United States Patent
Janczak et al.

(10) Patent No.: US 8,473,134 B1
(45) Date of Patent: Jun. 25, 2013

(54) METHOD AND APPARATUS FOR OPERATING A VEHICLE INCLUDING A HYBRID POWERTRAIN SYSTEM DURING A LAUNCH MANEUVER

(75) Inventors: John Janczak, Commerce Township, MI (US); Anthony H. Heap, Ann Arbor, MI (US); Anthony James Corsetti, Rochester Hills, MI (US); Kee Yong Kim, Ann Arbor, MI (US); Samantha Victoria Lado, Pittsfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/367,433

(22) Filed: Feb. 7, 2012

(51) Int. Cl.
*B60L 9/00* (2006.01)
*B60L 11/00* (2006.01)

(52) U.S. Cl.
USPC ............... 701/22; 701/90; 701/55; 180/285; 903/902

(58) Field of Classification Search
USPC ...................................................... 701/22, 90
See application file for complete search history.

(56) References Cited

U.S. PATENT DOCUMENTS

| | | | |
|---|---|---|---|
| 2004/0030469 A1* | 2/2004 | MacBain | 701/22 |
| 2008/0033620 A1* | 2/2008 | Kamichi et al. | 701/59 |
| 2008/0236921 A1* | 10/2008 | Huseman | 180/165 |
| 2008/0300743 A1* | 12/2008 | Conlon et al. | 701/22 |
| 2009/0076672 A1* | 3/2009 | Bajwa | 701/22 |
| 2009/0076679 A1* | 3/2009 | Martini et al. | 701/34 |
| 2009/0088279 A1* | 4/2009 | Martini et al. | 475/5 |
| 2009/0105896 A1* | 4/2009 | Tamai et al. | 701/22 |
| 2009/0118917 A1* | 5/2009 | Sah et al. | 701/54 |
| 2009/0118936 A1* | 5/2009 | Heap et al. | 701/54 |
| 2009/0118942 A1* | 5/2009 | Hsieh et al. | 701/54 |
| 2009/0118943 A1* | 5/2009 | Heap et al. | 701/54 |
| 2009/0118950 A1* | 5/2009 | Heap et al. | 701/55 |
| 2009/0264248 A1* | 10/2009 | Kozub et al. | 477/3 |
| 2010/0312422 A1* | 12/2010 | Imaseki | 701/22 |
| 2011/0004364 A1* | 1/2011 | Sawada et al. | 701/22 |
| 2011/0066308 A1* | 3/2011 | Yang et al. | 701/22 |
| 2011/0190971 A1* | 8/2011 | Severinsky et al. | 701/22 |
| 2011/0212802 A1* | 9/2011 | Conlon et al. | 475/5 |
| 2011/0238246 A1* | 9/2011 | Martini et al. | 701/22 |
| 2012/0010792 A1* | 1/2012 | Nedorezov et al. | 701/54 |
| 2012/0136518 A1* | 5/2012 | Samie et al. | 701/22 |
| 2012/0303189 A1* | 11/2012 | Namuduri et al. | 701/22 |

* cited by examiner

*Primary Examiner* — James Trammell
*Assistant Examiner* — Demetra Smith-Stewart

(57) ABSTRACT

A method for operating a vehicle including a hybrid powertrain system includes enabling a commanded electric vehicle (EV) launch when a high-voltage battery state-of-charge (SOC) is greater than an SOC threshold, a transmission output speed is less than a low speed threshold, a transmission output torque is less than a speed-based torque threshold, and an operator torque request is achievable in the EV traction mode. An EV traction mode is employed to execute the commanded EV launch in response to the operator torque request including a launch maneuver.

20 Claims, 3 Drawing Sheets

METHOD AND APPARATUS FOR OPERATING A VEHICLE INCLUDING A HYBRID POWERTRAIN SYSTEM DURING A LAUNCH MANEUVER

TECHNICAL FIELD

This disclosure is related to operation of vehicles employing hybrid powertrain systems during a launch.

BACKGROUND

Known vehicle systems use hybrid powertrain architectures to generate tractive torque using plural torque-generative devices including internal combustion engines and one or more non-hydrocarbon-fueled torque machines, which may include electric machines that transform electric power to mechanical torque. Hybrid powertrain architectures may be configured to transfer tractive torque to an output member through a transmission device. Hybrid powertrain architectures can include series-hybrid configurations, parallel-hybrid configurations, and compound-split hybrid configurations. Electric machines operative as motors and generators can be controlled to generate torque inputs to the transmission independently of a torque input from the internal combustion engine. The electric machines may react and transform vehicle kinetic energy transmitted through the vehicle driveline to electrical energy that is storable in an electrical energy storage device employing regenerative braking and other methods. A control system monitors various inputs from the vehicle and the operator and provides operational control of the powertrain, including controlling transmission operating range state and gear shifting, controlling operation of the engine and the torque machines, and regulating the electrical power interchange among the electrical energy storage device and the electric machines to manage torque and rotational speed outputs of the transmission.

Known control systems control operation of an engine to one of an engine-on mode and an engine-off mode, which may include a fuel cutoff mode. Known control systems control operation of a hybrid powertrain system to generate tractive torque, including tractive torque for launching a vehicle from a zero-speed or near zero-speed condition in response to an operator request for output torque.

Vehicles equipped with hybrid powertrain systems and extended-range electric vehicle powertrain systems may operate using battery charge-depletion control schemes or battery charge-sustaining control schemes. All energy for propulsion including energy for battery charging originates from on-board fuel in a vehicle that employs a battery charge-sustaining control scheme. Thus, a vehicle employing a battery charge-sustaining control scheme may command operation of the engine under conditions when an operator is expecting vehicle operation in an electric-only mode, such as during a low speed launch. However, avoiding operation of the engine in specific circumstances may negatively affect overall fuel economy due to a need to provide battery charging under less-optimal conditions. Vehicle and powertrain control schemes are expected to provide consistent vehicle operation during maneuvers, e.g., launches, and consider vehicle metrics such as fuel economy.

SUMMARY

A method for operating a vehicle including a hybrid powertrain system includes enabling a commanded electric vehicle (EV) launch when a high-voltage battery state-of-charge (SOC) is greater than an SOC threshold, a transmission output speed is less than a low speed threshold, a transmission output torque is less than a speed-based torque threshold, and an operator torque request is achievable in the EV traction mode. An EV traction mode is employed to execute the commanded EV launch in response to the operator torque request including a launch maneuver.

BRIEF DESCRIPTION OF THE DRAWINGS

One or more embodiments will now be described, by way of example, with reference to the accompanying drawings, in which.

DETAILED DESCRIPTION

Figure 1:
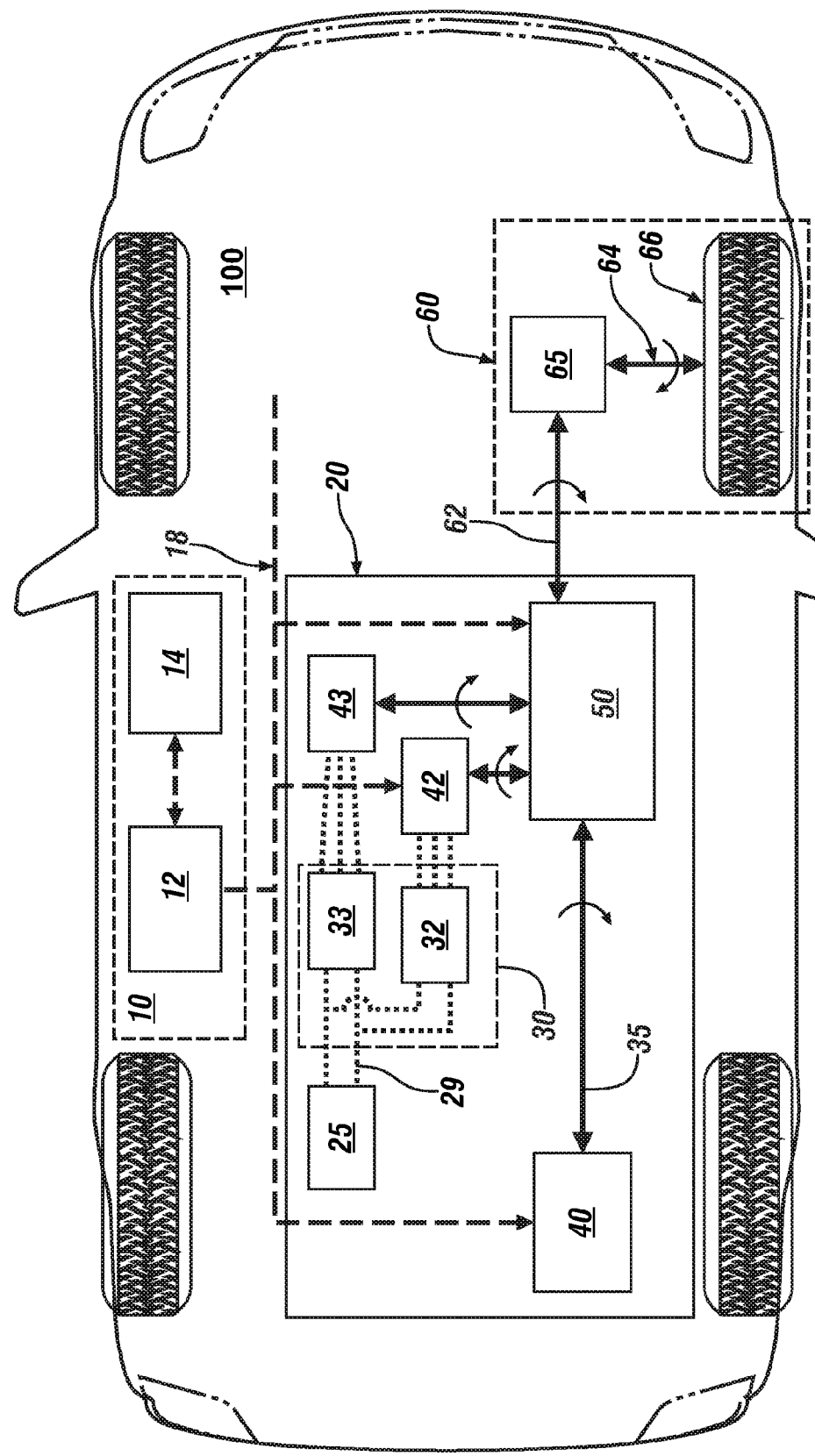
FIG. 1 illustrates a diagram of a vehicle including a hybrid powertrain system having an engine, hybrid transmission, torque machines, and a driveline, in accordance with the present disclosure.

Referring now to the drawings, wherein the showings are for the purpose of illustrating certain exemplary embodiments only and not for the purpose of limiting the same, FIG. 1 schematically shows a vehicle 100 including a hybrid powertrain system 20 coupled to a driveline 60 and controlled by a control system 10. The hybrid powertrain system 20 is a non-limiting embodiment of a hybrid powertrain system that employs multiple torque-generative devices including an internal combustion engine and one or more non-internal combustion torque machines to generate tractive torque. Other suitable hybrid powertrain systems may be configured to generate tractive torque under specific conditions as described herein with similar effect. By way of example, the hybrid powertrain system may employ an internal combustion engine and other suitable non-internal combustion torque machine(s) including but not limited to hydraulic-mechanical torque machines, pneumatic-mechanical torque machines, and others. The hybrid powertrain system 20 is configured to operate in one of multiple tractive torque generative modes wherein only a non-internal combustion engine torque machine is employed to generate tractive torque, referred to herein as an electric vehicle (EV) traction mode. In one embodiment, the EV traction mode includes operating the hybrid powertrain system 20 in a continuously variable operating range state with the engine in an OFF state. In one embodiment, the EV traction mode includes operating the hybrid powertrain system 20 in a continuously variable operating range state with the engine in a fuel cutoff (FCO) state. In one embodiment, the EV traction mode includes operating the hybrid powertrain system 20 in a continuously variable operating range state with the engine operating in an idle state.

The hybrid powertrain system 20 described herein includes a mechanical power path that includes engine 40 and first and second electrically-powered torque machines 42 and 43, respectively, that mechanically couple to a hybrid transmission 50 having an output member 62 that couples to the driveline 60. A high-voltage electrical circuit 30 electrically connects to a high-voltage battery 25 via a high-voltage bus 29. The high-voltage electrical circuit 30 includes first and second electric power inverters 32 and 33, respectively that electrically connect to the first and second torque machines 42 and 43, respectively.

The engine 40 may be any suitable internal combustion engine, and is preferably a multi-cylinder direct fuel injection internal combustion engine that converts fuel to mechanical power through a combustion process. The engine 40 is configured to execute autostart and autostop control schemes and FCO control schemes during ongoing operation of the hybrid powertrain system 20. The engine 40 is considered to be in an ON state when it is being fueled and is rotating and generating torque, and is considered to be in the OFF state when it is not being fueled and is not rotating. The engine 40 is considered to be in the FCO state when it is rotating but is not being fueled. The engine 40 is considered to be in the idle state when it is fueled and firing, but is generating a de minimis amount of torque. The engine 40 may be started to generate tractive torque transferable to the driveline 50 and/or to provide power to the first torque machine 42 to generate energy that may be used by one or both the first and second torque machines 42, 43 to generate tractive torque.

The first and second torque machines 42 and 43 may be any suitable devices configured to convert stored energy to mechanical power, and include multi-phase electric motor/generators in one embodiment. The multi-phase electric motor/generators are configured to convert stored electric energy to mechanical power when operating in a torque generating state and convert mechanical power to electric energy that can be stored in the high-voltage battery 25 when operating in an electric power generating state. The transmission 50 may be any suitable torque transmission device, and in one embodiment includes one or more differential gear sets and torque-transfer clutches and brakes to effect torque transfer over a range of speeds between the engine 40, the first and second torque machines 42 and 43, and the output member 62 that couples to the vehicle driveline 60. The transmission 50 is preferably configured to operate in fixed-gear and continuously variable operating range states by selective activation of the torque-transfer clutches. Thus, the powertrain system 20 is configured to operate in a plurality of tractive torque generative modes that include fixed-gear and continuously variable operating range states with the engine 40 in one of the ON state, the OFF state, and the FCO state.

The driveline 60 includes a differential gear device 65 that mechanically couples to an axle 64 or half-shaft that mechanically couples to a wheel 66 in one embodiment. The differential gear device 65 is coupled to the output member 62 of the hybrid powertrain system 20, and transfers output power therebetween. The driveline 60 transfers tractive power between the hybrid transmission 50 and a road surface. Mechanical power originating in the engine 40 may be transferred via an input member 35 to the first torque machine 42 and to the output member 62 via the hybrid transmission 50. Mechanical power originating in the first torque machine 42 may be transferred to the engine 40 via the input member 35 and to the output member 62 via the hybrid transmission 50. Mechanical power originating in the second torque machine 43 may be transferred via the hybrid transmission 50 to the output member 62. Mechanical power can be transferred between the hybrid transmission 50 and the driveline 60 via the output member 62. Other powertrain system configurations may be employed to similar effect.

The high-voltage battery 25 stores potential electric energy and is electrically connected via the high-voltage bus 29 to the high-voltage electrical circuit 30 that connects to the first and second torque machines 42 and 43 to transfer electric power therebetween. It is appreciated that the high-voltage battery 25 is an electric energy storage device that can include a plurality of electrical cells, ultracapacitors, and other devices configured to store electric energy on-vehicle. One exemplary high-voltage battery 25 includes a plurality of lithium-ion cells. Parametric states associated with the high-voltage battery 25 include a state-of-charge (SOC), temperature, available voltage, and available battery power, each of which is monitored by the control system 10.

The high-voltage electrical circuit 30 includes first and second inverters 32 and 33 that electrically connect to the first and second torque machines 42 and 43, respectively. The first and second torque machines 42 and 43 interact with the respective first and second inverters 32 and 33 to convert stored electric energy to mechanical power and convert mechanical power to electric energy that can be stored in the high-voltage battery 25. The first and second electric power inverters 32 and 33 are operative to transform high voltage DC electric power to high-voltage AC electric power and are also operative to transform high voltage AC electric power to high-voltage DC electric power. Electric power originating in the first torque machine 42 may be transferred electrically to the high-voltage battery 25 via the high-voltage electrical circuit 30 and the high-voltage bus 29 and to the second torque machine 43 via the high-voltage electrical circuit 30. Electric power originating in the second torque machine 43 may be transferred electrically to the high-voltage battery 25 via the high-voltage electrical circuit 30 and the high-voltage bus 29 and to the first torque machine 42 via the high-voltage electrical circuit 30.

The control system 10 includes a control module 12 configured to control operation of the vehicle 100 including the hybrid powertrain system 20 in response to operator inputs detected via an operator interface 14. The operator interface 14 captures and conveys information from a plurality of human/machine interface devices through which the vehicle operator commands operation of the vehicle 100, including, e.g., an ignition switch to enable an operator to crank and start the engine 40, an accelerator pedal, a brake pedal, and a transmission range selector (PRNDL). Although the control module 12 and operator interface 14 are shown as individual discrete elements, such an illustration is for ease of description. It is appreciated that information transfer to and from the control module 12 can be accomplished using one or more communications paths, e.g., communications bus 18, which can include one or more of a direct connection, a local area network bus, and a serial peripheral interface bus. The control module 12 signally and operatively connects to individual elements of the hybrid powertrain system 20 directly or via one or more communications buses, shown herein as communications bus 18. The control module 12 signally connects to the sensing devices of each of the high-voltage battery 25, the high-voltage bus 29, the first and second electric power inverters 32 and 33, the first and second torque machines 42 and 43, the engine 40, and the hybrid transmission 50 to monitor operation and determine parametric states thereof. The control module 12 operatively connects to the actuators of the first and second inverters 32 and 33, the engine 40, and the hybrid transmission 50 to control operation thereof in accordance with executed control schemes that are stored in the form of algorithms and calibrations. It is appreciated that each of the first and second inverters 32 and 33 transforms electric power in a manner suitable for generating torque by employing one or both the first and second torque machines 42 and 43, and transforms mechanical power in a manner suitable for generating electric power by employing one or both the first and second torque machines 42 and 43, depending upon torque inputs and operating conditions.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The control module 12 executes control schemes to control operation of the engine 40 in coordination with the first and second electric power inverters 32 and 33 to control overall operation of the hybrid powertrain system 20 to manage transfer of mechanical power to the driveline 60 and to manage electric power flow to the high-voltage battery 25. Such control schemes include balancing operation of the engine 40 with allowable battery power limits associated with the high-voltage battery 25 while achieving an output torque to the driveline 60 that is responsive to an operator torque request.

Figure 2:
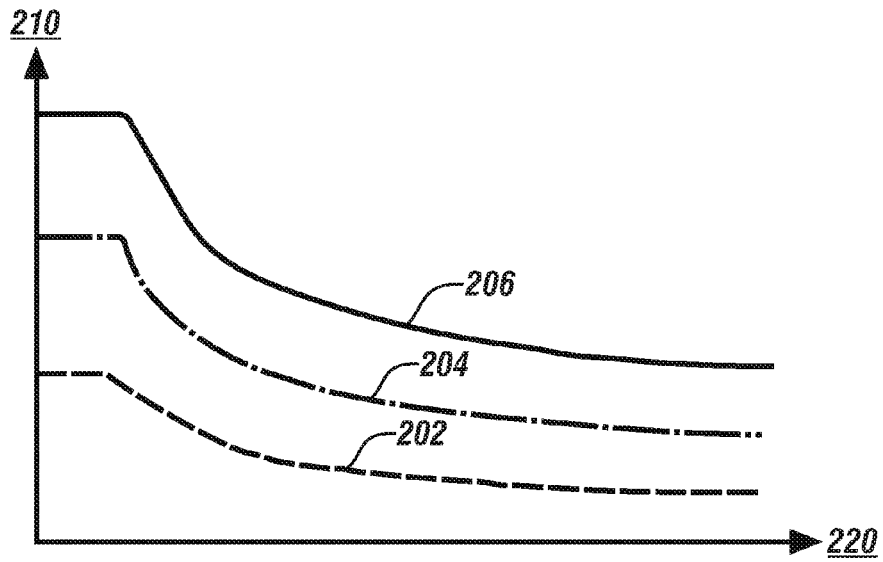
FIG. 2 illustrates a plurality of EV launch speed/acceleration calibration curves that define a maximum acceleration rate in relation to vehicle speed for permitting operation in and EV traction mode during an EV launch, in accordance with the present disclosure.

FIG. 2 graphically illustrates a plurality of EV launch speed/acceleration calibration curves (EV launch curves) 202, 204, and 206, with acceleration (on y-axis 210) depicted in relation to speed (on x-axis 220). The EV launch curves 202, 204, and 206 each define and set an acceleration limit, i.e., a maximum acceleration rate in relation to vehicle speed for permitting operation in the EV traction mode during an EV launch. The EV launch curves 202, 204, and 206 each define a relationship for vehicle speed and acceleration for operating an embodiment of the vehicle 100 in the EV traction mode in response to an operator torque request so long as the operator torque request is less than a desired acceleration level corresponding to vehicle speed. The EV launch curves 202, 204, and 206 are meant to be illustrative.

A launch is a vehicle maneuver that includes accelerating a vehicle from a stopped or near-stopped condition in a forward or reverse direction in response to an operator input to the accelerator pedal. In one embodiment a launch is indicated by transition of vehicle speed from at or near zero speed to a non-zero speed. A launch is executed by determining and controlling torque contributions from the electrically-powered torque machines 42 and 43 and the internal combustion engine 40 to generate tractive torque in a manner that is responsive to the operator torque request while minimizing fuel consumption and maximizing battery power utilization. A launch may be executed in the EV traction mode and in a non-EV traction mode. The EV traction mode has been described. The hybrid powertrain system 20 employs the internal combustion engine 40 to provide some or all of the tractive torque in the non-EV traction mode. This includes generating tractive torque in a manner that is responsive to the operator torque request while minimizing fuel consumption and maximizing battery power utilization.

The EV launch curves 202, 204, and 206 each define and set an acceleration limit, i.e., a maximum acceleration rate in relation to vehicle speed in the EV traction mode, and are employed by the control system to control torque outputs of the electrically-powered torque machines 42 and 43 to generate tractive torque in response to the operator torque request. The EV launch curves 202, 204, and 206 are preferably experimentally derived to balance drive quality, battery power, and overall fuel consumption for a specific vehicle model. The EV launch curves 202, 204, and 206 are preferably developed using a representative vehicle with a single occupant, wherein the vehicle and powertrain system are warmed-up and the vehicle is operating on a level surface with minimal wind resistance and starting at zero speed.

Figure 4:
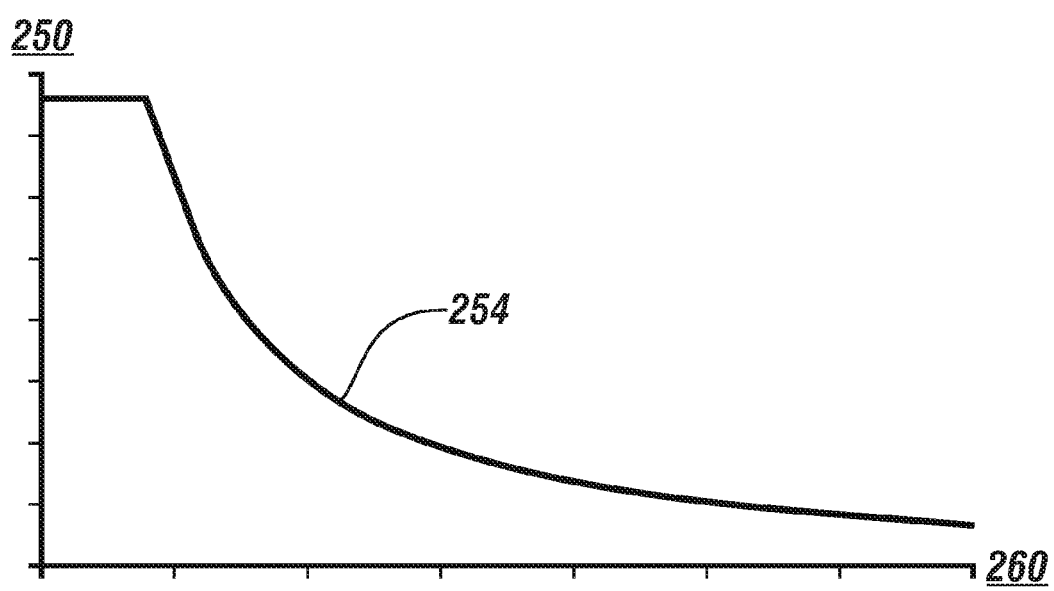
FIG. 4 illustrates a speed/torque calibration curve for a selected one of the EV launch speed/acceleration calibration curves showing a maximum transmission output torque in relation to transmission output speed that may be employed during an EV launch maneuver to control operation of the hybrid powertrain system, in accordance with the present disclosure.

FIG. 4 graphically shows a speed/torque calibration curve 254 plotted with transmission output torque (on y-axis 250) depicted in relation to transmission output speed (on x-axis 260). The speed/torque calibration curve 254 represents a selected one of the EV launch curves, i.e., curve 204 shown with reference to FIG. 2 that has been translated to a transmission output speed and transmission torque for a selected embodiment of the hybrid powertrain system 20 and vehicle 100 during a launch maneuver. The selected EV launch curve may be translated to transmission output speed and transmission torque and employed to control torque output(s) of the electrically-powered torque machines 42 and 43 using Newton's law of Force=Mass*Acceleration calculations to calculate a torque command (Force) that correlates to an acceleration command (Acceleration) for the selected embodiment of the hybrid powertrain system 20 and vehicle 100 (Mass). The speed/torque calibration curve 254 defines a relationship for transmission output speed and transmission output torque for commanding operation in the EV traction mode in response to an operator torque request so long as the operator torque request is less than a threshold transmission output torque determined in relation to the transmission output speed, which corresponds to the vehicle speed.

Figure 3:
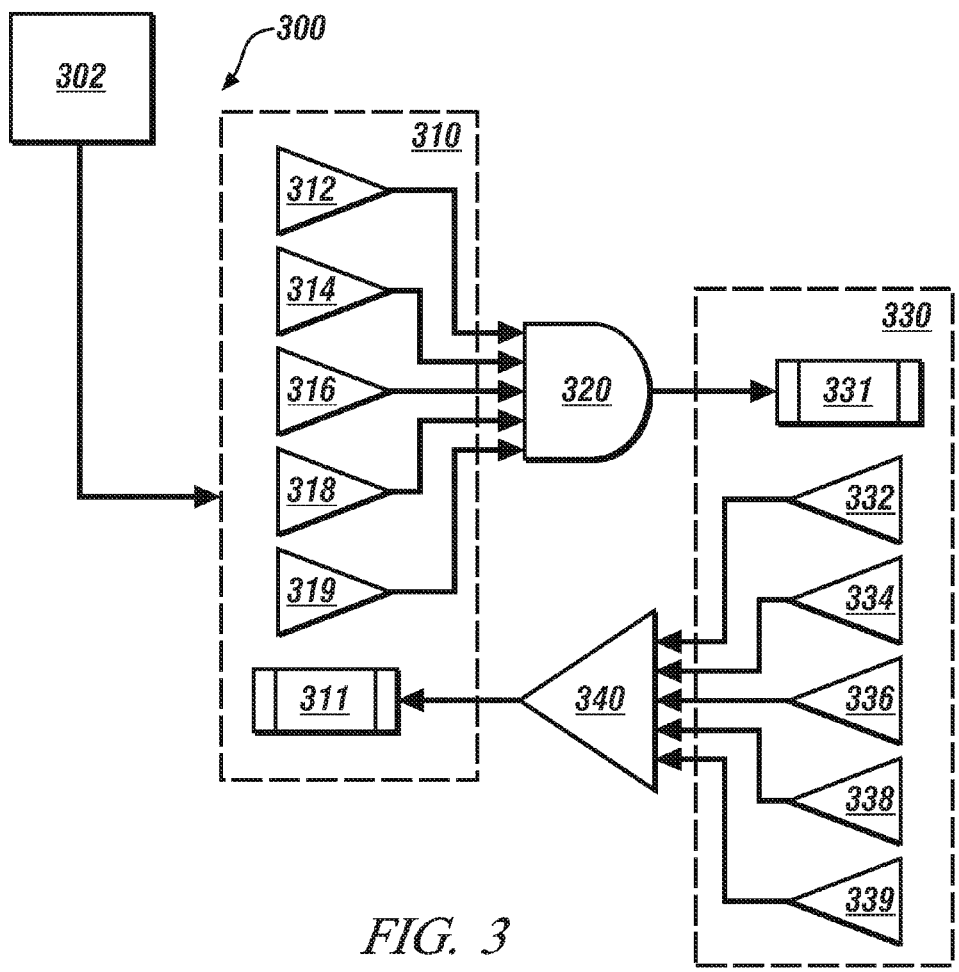
FIG. 3 illustrates a control scheme for enabling and disabling an EV launch in response to an operator torque request, in accordance with the present disclosure.

FIG. 3 schematically shows a control scheme 300 for enabling and disabling a commanded EV launch in response to an operator torque request that includes a command to execute a launch maneuver. The control scheme 300 may be executed in a hybrid vehicle, e.g., as described with reference to FIG. 1. Table 1 is provided as a key to FIG. 3 wherein the numerically labeled blocks and the corresponding functions are set forth as follows.

TABLE 1

| BLOCK | BLOCK CONTENTS |
|---|---|
| 302 | Initiate vehicle launch |
| 310 | Permissive EV launch mode |
| 311 | Execute permissive EV launch |
| 312 | Is EV traction mode allowed? |
| 314 | Is high-voltage battery SOC greater than SOC threshold? |
| 316 | Is transmission output speed less than a low speed threshold? |
| 318 | Is transmission output torque less than a speed-based torque threshold? |
| 319 | Is operator torque request achievable in EV traction mode? |

TABLE 1-continued

| BLOCK | BLOCK CONTENTS |
|---|---|
| 320 | Enable commanded EV launch? |
| 330 | Commanded EV launch mode |
| 331 | Execute commanded EV launch mode |
| 332 | Is non-EV traction mode requested? |
| 334 | Is high-voltage battery SOC less than SOC threshold? |
| 336 | Is transmission output speed greater than high speed threshold? |
| 338 | Is transmission output torque greater than speed-based torque threshold? |
| 339 | Is operator torque request unachievable in EV traction mode? |
| 340 | Disable commanded EV launch? |

Overall, the control scheme 300 allows one of a commanded EV launch 331 and a permissive EV launch 311 to be executed in response to an operator torque request to initiate a vehicle launch 302. The commanded EV launch 331 is a control scheme for commanding and controlling vehicle acceleration employing the EV traction mode to accelerate the vehicle in response to an operator torque request so long as select enabling conditions are met, as described herein. The permissive EV launch 311 is a control scheme for controlling vehicle acceleration employing either the EV traction mode or the non-EV traction mode to accelerate the vehicle in response to the operator torque request.

Enabling conditions include elements 312, 314, 316, 318, 319, 332, 334, 336, 338, and 339, which are represented as logic comparators that generate discrete outputs of either high or low, depending upon the compared signals. Element 320 is represented as a logic AND gate, and element 340 is represented as a logic OR gate. The use of logic devices is meant to illustrate the enabling conditions described herein, and does not indicate a preferred means of enabling of the control scheme 300. The elements 312, 314, 316, 318, 319, and 320 are associated with enabling a commanded EV launch mode 330 including commanding an EV traction mode in response to an operator torque request including a launch. The elements 332, 334, 336, 338, 339, and 340 are associated with discontinuing enabling the commanded EV launch 331 after its execution has been enabled and operating in a permissive EV launch mode 310 to execute the permissive EV launch 311. Discontinuing the commanded EV launch 331 includes operations for executing the permissive EV launch 311 in response to the operator torque request including the launch.

Operation of the control scheme 300 is as follows. In response to an operator torque request to initiate a vehicle launch 302, a default state of the permissive launch mode 310 is enabled. The commanded EV launch mode 330 is enabled only when all of the elements 312, 314, 316, 318, and 319 associated with enabling the commanded EV launch 331 are high, indicating all the enabling conditions for executing the commanded EV launch 331 are met. Element 312 determines whether the control system allows operation in an EV traction mode in view of current operating conditions, which may include limitations imposed by battery temperature, motor and engine speeds and torques, and other limitations. The powertrain system may be configured to operate in one or more EV traction modes, and this condition is met as long as one of the EV traction modes is commanded. Element 314 determines whether a high-voltage battery SOC is greater than an SOC threshold. Thus, executing the commanded EV launch 331 requires that the SOC be greater than a minimum SOC. If the SOC is less than the SOC threshold, the high-voltage battery is incapable of sustaining operation in the EV traction mode during the launch, and the commanded EV launch is disabled. Element 316 determines whether a transmission output speed is less than a low speed threshold. The transmission output speed directly correlates to vehicle speed. Executing the commanded EV launch 331 requires an initial low or zero vehicle speed, with a corresponding transmission output speed. This condition is met when the vehicle speed is less than a predetermined threshold, e.g., less than 8 km/h.

Element 318 determines whether a transmission output torque is less than a speed-based torque threshold. FIG. 4 shows an exemplary speed/torque calibration curve 254 that may be employed to determine the speed-based torque threshold associated with permitting an EV launch. The speed-based torque threshold is preferably determined in relation to the transmission output speed employing an algorithmic lookup table or another predetermined relationship. The speed-based torque threshold takes into account factors associated with driveability, fuel economy and the capacity of the torque machines 42, 43 to generate and transmit torque to the transmission or driveline. Thus, this condition is met when the transmission output torque is less than the speed-based torque threshold. Element 319 determines whether the operator torque request is achievable in the EV traction mode, and takes into account factors associated with driveability and fuel economy.

All of the elements 312, 314, 316, 318, and 319 associated with enabling the commanded EV launch mode 330 must be achieved to permit execution of the commanded EV launch 331. When execution of the commanded EV launch 331 is permitted, the elements 332, 334, 336, 338, and 339 associated with disabling executing the commanded EV launch are monitored. When any of the elements 332, 334, 336, 338, and 339 are met, the control scheme disables the commanded EV launch mode 330 and discontinues execution of the commanded EV launch 331. The control scheme 300 commands operation in the permissive launch mode 310 to execute the permissive EV launch 311.

The commanded EV launch mode 330 is disabled and the commanded EV launch 331 is discontinued when any one of the elements 332, 334, 336, 338, and 339 associated with disabling the EV launch mode 330 is low, indicating at least one of the disabling conditions is met. Element 332 determines whether a non-EV traction mode is requested. This condition is met when a non-EV traction mode, e.g., a fixed gear mode, is commanded, thus disabling the commanded EV launch mode 330 and discontinuing execution of the commanded EV launch 331. Element 334 determines whether the high-voltage battery SOC is less than the SOC threshold, preferably with an allowance for hysteresis, during the EV launch. This condition is met when the SOC is less than the SOC threshold (allowing for hysteresis) because the high-voltage battery is incapable of sustaining operation in the EV traction mode during the launch. Thus the commanded EV launch mode 330 is disabled and execution of the commanded EV launch 331 is discontinued. Element 336 determines whether a transmission output speed is greater than a high speed threshold. This condition is met when the transmission output speed exceeds a predetermined threshold that indicates that the speed capability of the torque machines 42, 43 has been reached. Thus the commanded EV launch mode 330 is disabled and execution of the commanded EV launch 331 is discontinued.

Element 338 determines whether a transmission output torque is greater than a speed-based torque threshold, which may be equal to the speed-based torque threshold associated with element 318 with an allowance for hysteresis. FIG. 4 shows an embodiment of the speed/torque calibration curve 254 that may be employed to determine the speed-based torque threshold associated with executing the commanded EV launch mode 330. The speed-based torque threshold is preferably determined in relation to the transmission output speed employing an algorithmic lookup table or another predetermined relationship. The speed-based torque threshold takes into account factors associated with driveability, fuel economy and a capacity of the torque machines 42, 43 to generate and transmit torque to the transmission. This condition is met when the transmission output torque is greater than the speed-based torque threshold, preferably with allowance for hysteresis. The commanded EV launch mode 330 is disabled and execution of the commanded EV launch 331 is discontinued when this condition is met. Element 339 determines whether the operator torque request is unachievable in the EV traction mode. Such conditions may include a high accelerator pedal position, indicating an operator torque request for acceleration that is greater than the capability of the EV traction mode. The commanded EV launch mode 330 is disabled and execution of the commanded EV launch 331 is discontinued when this condition is met.

Thus, the control scheme 300 is configured to permit launch of the subject vehicle by commanding one of the commanded EV launch 331 and the permissive EV launch 311. The commanded EV launch 331 is commanded when the aforementioned conditions are met, and is executed until operating conditions no longer apply. However, if the operator torque request cannot be met in the EV traction mode, the control scheme 300 discontinues operation in the EV traction mode to avoid an unresponsive pedal. This includes unresponsiveness due to low battery power limits caused by a cold or hot battery.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a vehicle including a hybrid powertrain system, comprising:
    enabling a commanded electric vehicle (EV) launch when
        a high-voltage battery state-of-charge (SOC) is greater than an SOC threshold,
        a transmission output speed is less than a low speed threshold,
        a transmission output torque is less than a speed-based torque threshold, and
        an operator torque request is achievable in an EV fraction mode; and
    employing the EV traction mode to execute the commanded EV launch in response to the operator torque request comprising a launch maneuver, wherein said commanded EV launch comprises employing only a non-combustion torque machine to accelerate the vehicle from one of a stopped and a near-stopped condition.

2. The method of claim 1, further comprising discontinuing the commanded EV launch when the transmission output speed is greater than a high speed threshold.

3. The method of claim 1, further comprising discontinuing the commanded EV launch when a non-EV traction mode is commanded.

4. The method of claim 1, further comprising discontinuing the commanded EV launch when the high-voltage battery SOC is not greater than the SOC threshold.

5. The method of claim 1, further comprising disabling the EV traction mode when the transmission output torque is greater than the speed-based torque threshold.

6. The method of claim 1, further comprising disabling the EV traction mode when the operator torque request cannot be achieved in the EV traction mode.

7. The method of claim 6, wherein disabling the EV traction mode includes operating in a non-EV traction mode in response to the operator torque request comprising the launch maneuver.

8. The method of claim 1, wherein employing the EV traction mode comprises operating the hybrid powertrain system with the engine in an OFF state.

9. The method of claim 1, wherein employing the EV traction mode comprises operating the hybrid powertrain system with the engine in a fuel cutoff state.

10. The method of claim 1, wherein employing the EV traction mode comprises operating the hybrid powertrain system with the engine operating in an idle state.

11. Method for operating a vehicle including a hybrid powertrain system, comprising commanding operation in an electric vehicle (EV) traction mode to effect a launch maneuver in response to an operator torque request when a high-voltage battery state-of-charge (SOC) is greater than an SOC threshold, a transmission output speed is less than a low speed threshold, a transmission output torque is less than a speed-based torque threshold, and the operator torque request is achievable in the EV traction mode, wherein said launch maneuver in the EV traction mode comprises employing only a non-combustion torque machine to accelerate the vehicle from one of a stopped and a near-stopped condition.

12. The method of claim 11, further comprising disabling the commanded operation in the EV fraction mode when a non-EV traction mode is commanded.

13. The method of claim 12, further comprising disabling the commanded operation in the EV traction mode when the high-voltage battery SOC is less than the SOC threshold.

14. The method of claim 13, further comprising disabling the commanded operation in the EV traction mode when the transmission output torque is greater than the speed-based torque threshold.

15. The method of claim 14, further comprising disabling the commanded operation in the EV traction mode when the operator torque request cannot be achieved in the EV traction mode.

16. The method of claim 15, wherein disabling the commanded operation in the EV traction mode includes permitting operating in a non-EV traction mode during the launch maneuver.

17. The method of claim 15, further comprising subsequently permitting operating in the EV traction mode during the launch maneuver.

18. The method of claim 11, wherein commanding operation in the EV traction mode comprises operating the hybrid powertrain system with the engine in an OFF state.

19. The method of claim 11, wherein commanding operation in the EV traction mode to effect the launch maneuver in response to the operator torque request comprises controlling torque output of the hybrid powertrain system in the EV fraction mode to achieve a vehicle acceleration rate responsive to the operator torque request until the transmission output speed exceeds a high speed threshold.

20. Method for operating a vehicle including a hybrid powertrain system, comprising:

commanding operation in an electric vehicle (EV) traction mode to effect a launch maneuver in response to an operator torque request when a high-voltage battery state-of-charge (SOC) is greater than an SOC threshold, a transmission output speed is less than a low speed threshold, a transmission output torque is less than a speed-based torque threshold, and the operator torque request is achievable in the EV traction mode, wherein said launch maneuver in the EV traction mode comprises employing only a non-combustion torque machine to accelerate the vehicle from one of a stopped and a near-stopped condition; and disabling the commanded operation in the EV traction mode during the launch maneuver when the transmission output speed exceeds a high speed threshold.

* * * * *